March 6, 1934.   F. E. BERGGREN   1,950,078
METHOD AND MEANS FOR DISBARKING LONG CUT LUMBER
WITH THE AID OF DISBARKING DRUMS
Filed Dec. 12, 1931   3 Sheets-Sheet 3

Inventor:
Frans Ejnar Berggren,
by Byrnes, Townsend & Potter,
Attorneys.

Patented Mar. 6, 1934

1,950,078

UNITED STATES PATENT OFFICE 1,950,078

METHOD AND MEANS FOR DISBARKING LONG-CUT LUMBER WITH THE AID OF DISBARKING DRUMS

Frans Ejnar Berggren, Kramfors, Sweden

Application December 12, 1931, Serial No. 580,700
In Sweden December 23, 1930

10 Claims. (Cl. 144—208)

The present invention refers to a method of disbarking long-cut lumber by means of rotatable disbarking drums while the lumber is kept floating, for instance in a float route. The object of the invention is to obviate the tedious and inexpensive work, which has been hitherto required for picking up the lumber from the water and for its further conveyance to a special disbarking plant. The movability of the lumber in the water and the ordinarily necessary presence of the water for the disbarking operation are utilized, according to the invention, in an exceedingly convenient and, at the same time, economical manner.

The method forming the subject of this invention is principally distinguished by the feature that the water level, for instance in a float route in which one or more disbarking drums are submerged, is raised relatively to the drum either by the latter being lowered or by the water being dammed up, so that the lumber may be floated into the drum, whereupon the water is lowered relatively to the drum either by the latter being raised or by the water being drawn off, so that the lumber will be carried by the drum, to permit of being disbarked when the drum is rotated, after which the water is again raised by the drum being lowered or by the water being dammed up, so that the disbarked lumber can be floated out of the drum.

Figure 1:
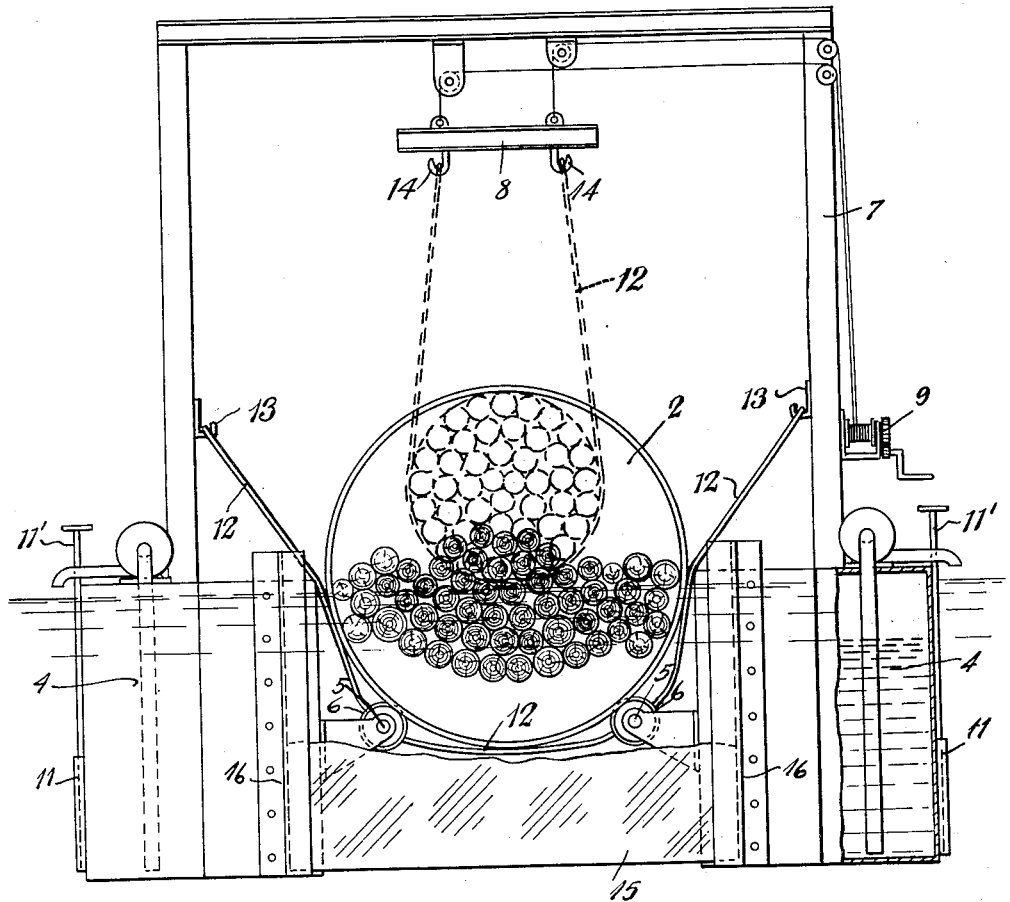
Figure 2:
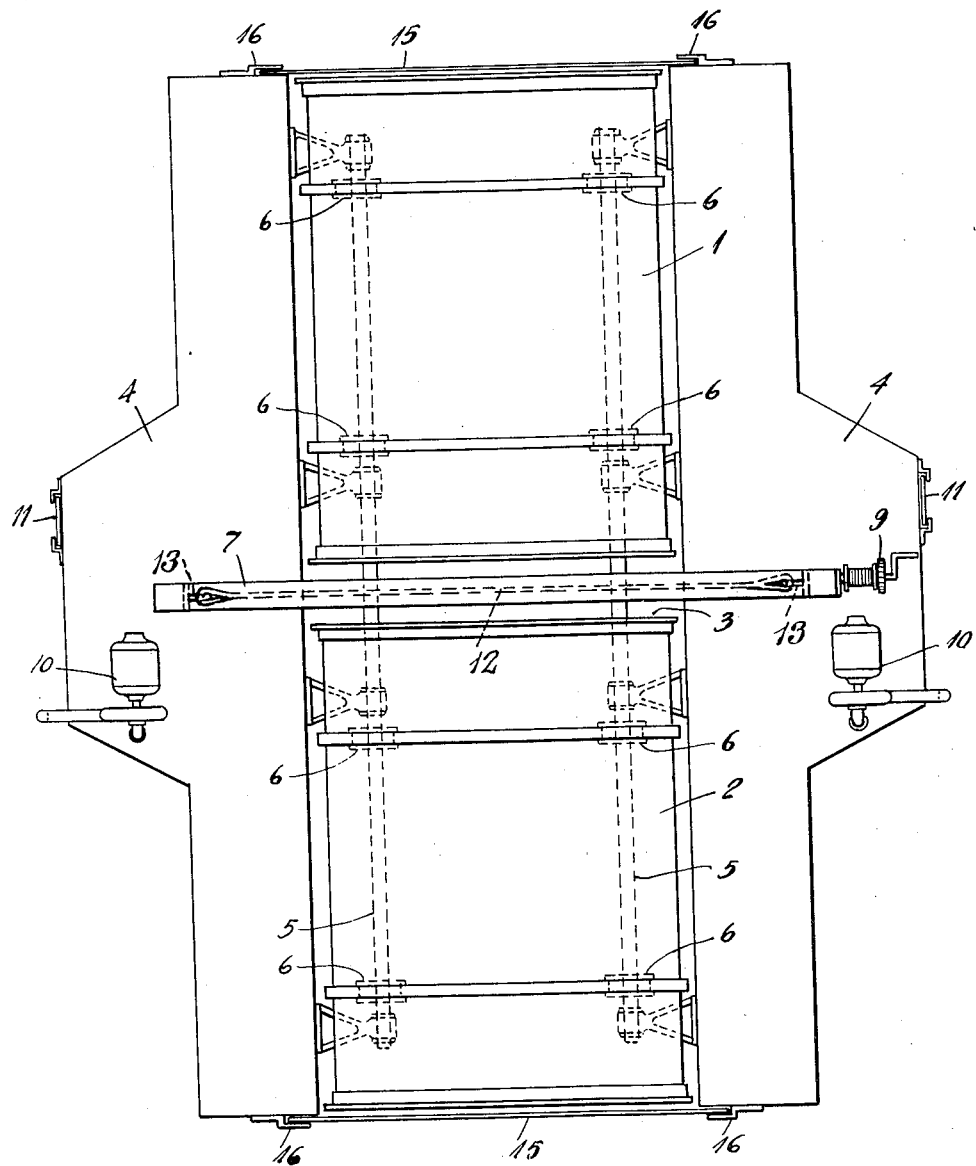
Figure 3:
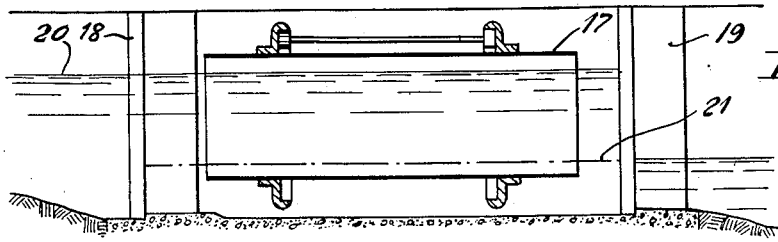
Figure 4:
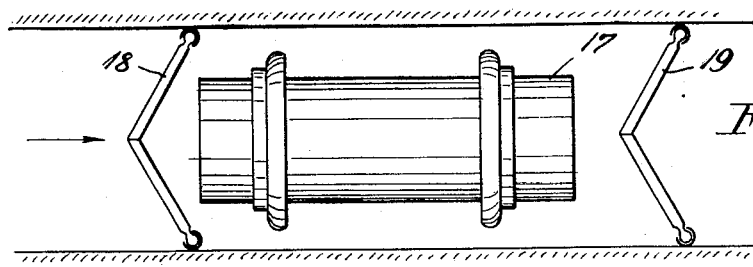
Figure 5:
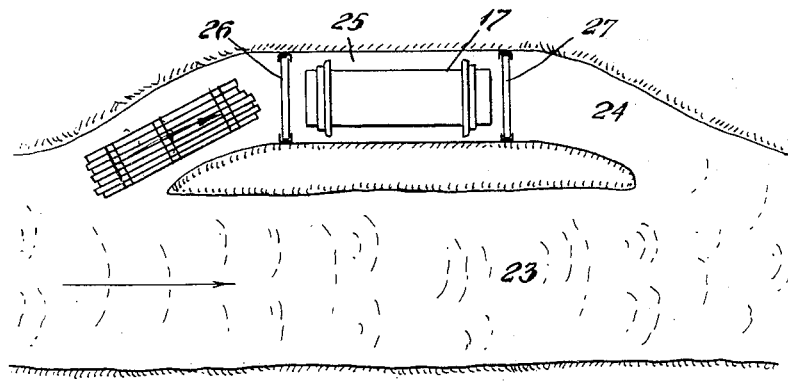
Figure 6:
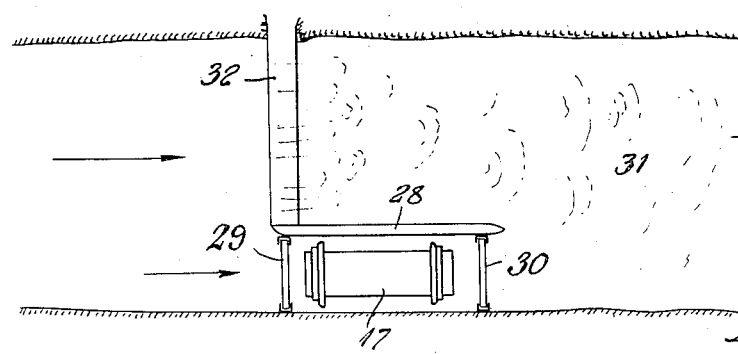

The accompanying drawings illustrate two suitable arrangements by way of example for carrying the method into effect. Fig. 1 shows the one arrangement viewed in the longitudinal direction of the disbarking drum or drums, and Fig. 2 is a plan view of the arrangement. Figs. 3 and 4 show a longitudinal section and a plan view respectively of a sluice with a disbarking drum arranged in a float route. Fig. 5 is a plan view of a drum basin arranged in a branch of a main stream. Fig. 6 is a plan view of another arrangement with the drum basin disposed next to the one bank of a stream.

According to Figs. 1 and 2, 1 and 2 designate two cylindrical disbarking drums situated axially behind each other and adapted to be rotated in any suitable manner, a space 3 being provided between the two ends of the drums facing each other. The drums 1 and 2 are carried by two pontoons 4 floating in the water. Mounted on these pontoons are shafts 5 having running wheels 6 secured thereto, said wheels supporting the drums and driving the same around by driving power being transmitted in any suitable manner to the one or the other shaft 5, or to both.

The pontoons carry a gallows 7, in which is suspended a hoist 8, which is connected with a windlass 9, for example, so that it may be raised and lowered independently of the pontoons. The latter are provided with pumps 10, by means of which they may be emptied when they are to be raised, and with valves or doors 11, through which the water may be admitted when the pontoons are to be lowered. The valves or doors are provided with push rods 11¹, by means of which they may be moved up and down. A rope, chain or the like 12 enters the space 3 between the disbarking drums, and the ends of said rope or chain may be secured either to hooks 13 attached to the posts of the gallows 7, as shown in Fig. 1, or to the hooks 14 of the hoist 8. The outwardly directed ends of the disbarking drums are covered during the disbarking operation by doors 15 adapted to be displaced up and down in guides 16 secured to the pontoons.

The arrangement above described is used in the following manner:

For the purpose of introducing lumber into the disbarking drums 1 and 2, the pontoons 4 are filled with water and are kept submerged, together with the disbarking drums, approximately to the depth shown in Fig. 1. The door 15 of the drum 2 is raised, so that the end of the drum adjacent to the door is uncovered. The rope 12 is kept secured to the hooks 14. A bundle of lumber floating in the raft route and wrapped with bands in the ordinary manner is floated in through the open end of the drum, and is thus brought over the rope 12. The pumps 10 are started, and raising of the drums commences. The rope 12 is secured to the hooks 14 of the hoist 8, and the latter is started to move in an upward direction. The rope 12 then tightens about the lumber bundle, which is then compressed so that the bands thereof loosen, whereupon the bands may be cut off and removed. This is carried out by a man entering the drums through the space 3. After the bands have thus been removed, the hoist 8 is lowered. Since the lumber bundle is then supported by the drums and the rope 12 slackens, the lumber bundle falls apart, so that the individual logs become movable relatively to each other, as is required for the disbarking operation. The rope 12 is then secured to the hooks 13 where it remains hanging during the disbarking operation. The pontoons 4 are now relieved of more water, so that the drums are brought into disbarking position, whereupon they are caused to rotate and the lumber is disbarked.

The disbarking having been finished, the pontoon doors 11 are opened, so that the pontoons are lowered together with the drums. The rope 12 is secured to the hoist hooks 14 and the hoist 8 is raised, the rope 12 then again tightening about the lumber bundle and compressing the same, so that it may be wrapped with a band, such as tape, which for this purpose has been lying submerged in readiness in the same place as the rope 12. After the band has been wrapped about the bundle, the hoist 8 is again lowered, and the rope 12 then slackening is secured to the hooks 13. The door 15 of the drum 1 is then raised, and the disbarked lumber bundle is rafted out of the drum, whereupon another bundle is rafted in and the procedure is repeated.

According to Figs. 3 and 4, the disbarking drum 17 is mounted in any suitable manner at a constant level within a sluice occupying the width of the whole stream, that is to say of the raft route. 18 and 19 designate the sluice-gates. By opening the gate 18 while the gate 19 is closed, a water level 20 is established in the sluice and in the part of the water in front thereof. The lumber may then be floated into the disbarking drum. After the gate 18 has been closed, the sluice may be emptied, for instance to the level 21, whereby the lumber is brought into disbarking position within the drum. After the disbarking operation has been finished, the sluice is again filled and the lumber floats out of the drum when the gate 19 is opened anew.

According to Fig. 5, 23 denotes the main stream at a region of relatively rapid fall, and 24 a side branch, in which is arranged a drum basin 25 adapted to be closed by means of ordinary floodgates 26 and 27, for example. By opening the gate 26 the basin is filled and the lumber may be floated into the disbarking drum 17. When the gate 26 is then closed and the gate 27 is opened, the water level in the basin 25 and in the drum 17 is lowered, and the lumber is brought into disbarking position. The disbarking having been finished, the gate 26 is opened anew, and the lumber floats out of the drum 17. The basin 28 according to Fig. 6 may also be provided with ordinary flood-gates 29 and 30 for the purpose of rafting the lumber in and out. The basin is then disposed adjacent to the one bank of the raft route 31, between the opposite bank of which and the basin there may be provided a weir 32 or other suitable dam admitting passage of the water.

What I claim is:—

1. In the debarking of logs by means of debarking drums located in a raft route, the method which comprises establishing a water level at the drum which permits floating of logs into the drum, then effecting a lowering of the water level with respect to the drum, debarking the logs, then establishing a water level which permits floating of the logs out of the drum, and then floating the logs out of the drum.

2. A method for debarking lumber by means of debarking drums, comprising partially submerging the drum or drums in a raft route, relatively varying the level of the water with respect to the drum or drums to permit floating the lumber into the drum or drums, so floating the lumber, reversely varying the level of the water relatively to the drum or drums, rotating the drum or drums to debark the lumber and again varying the level of the water with respect to the drum or drums so that the debarked lumber may be floated out of the drum or drums.

3. In the debarking of logs by means of debarking drums located in a raft route traversed by bundles of logs, the method which comprises floating a bundle of logs into the drum, removing the bands which form the logs into a bundle, relatively varying the level of the water with respect to the drum to support the logs on the inner surface of the drum, rotating the drum to debark the logs, establishing a relatively higher water level to float the logs, and floating the logs out of the drum.

4. The invention as set forth in claim 3, wherein the debarked logs are formed into a bundle within the drum, and the bundle of debarked logs is floated out of the drum.

5. Apparatus for debarking logs, comprising a debarking drum and means supporting the same in a raft route, and means for varying the relative level of the water with respect to the drum.

6. The invention as set forth in claim 5, in combination with hoisting means for raising and lowering logs which are positioned within said drum.

7. The invention as set forth in claim 5, wherein said supporting means comprises pontoon means, and said level varying means comprises a gate on said pontoon means for admitting water thereto and a pump for removing water so admitted, whereby said pontoon means may be floated upon or submerged in the water of the raft route.

8. The invention as set forth in claim 5, wherein said level varying means comprises flood gates in said raft route and located, respectively, above and below the debarking drum.

9. Apparatus for debarking logs, comprising a debarking drum, and means forming a drum basin of less width than a raft route in which logs are floated, said means including upper and lower flood gates for alternatively opening the drum basin into the raft route above and below the said basin.

10. Apparatus for debarking logs, comprising a pair of spaced and axially alined debarking drums, means supporting said drums in a raft route, means for varying the relative water level at the drums to permit logs to float into and out of said drums and alternatively to support logs by and within the drums, and hoisting means including a sling movable in a vertical plane between said drums for raising and lowering logs positioned within said drums.

FRANS EJNAR BERGGREN.